United States Patent
Kim et al.

(10) Patent No.: US 9,698,951 B2
(45) Date of Patent: Jul. 4, 2017

(54) METHOD AND APPARATUS FOR TRANSMITTING/RECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 14/759,637

(22) PCT Filed: Jan. 13, 2014

(86) PCT No.: PCT/KR2014/000351
§ 371 (c)(1),
(2) Date: Jul. 7, 2015

(87) PCT Pub. No.: WO2014/109613
PCT Pub. Date: Jul. 17, 2014

(65) Prior Publication Data
US 2015/0349937 A1    Dec. 3, 2015

Related U.S. Application Data

(60) Provisional application No. 61/752,376, filed on Jan. 14, 2013.

(51) Int. Cl.
*H04L 5/00* (2006.01)
*H04B 7/06* (2006.01)
*H04W 24/08* (2009.01)

(52) U.S. Cl.
CPC .......... *H04L 5/0048* (2013.01); *H04L 5/0057* (2013.01); *H04L 5/0073* (2013.01);
(Continued)

(58) Field of Classification Search
CPC ..... H04L 5/0048; H04L 5/005; H04L 5/0057; H04B 7/0658; H04B 7/066
See application file for complete search history.

(56) References Cited

U.S. PATENT DOCUMENTS

2011/0007685 A1 * 1/2011 Ma .................. H01Q 25/00
                                                   370/315
2013/0003788 A1 * 1/2013 Marinier .............. H04B 7/024
                                                   375/219
(Continued)

FOREIGN PATENT DOCUMENTS

WO    2012/011657    1/2012
WO    2012/070889    5/2012

OTHER PUBLICATIONS

CATT, "Further discussion on periodic feedback," 3GPP TSG RAN WG1 meeting #70, R1-123216, Aug. 2012, 4 pages.
Renesas Mobile Europe Ltd., "On periodic feedback," 3GPP TSG-RAN WG1 Meeting #70, R1-123581, Aug. 2012, 5 pages.
(Continued)

*Primary Examiner* — Scott M Sciacca
(74) *Attorney, Agent, or Firm* — Lee, Hong, Degerman, Kang & Waimey

(57) ABSTRACT

The present invention relates to a wireless communication system. A method for user equipment transmitting channel state information (CSI) in the wireless communication system, according to the present invention, comprises the steps of: receiving information on an N number of CSI configurations for reporting the CSI; receiving information for selecting an M (2≤M≤N) number of the CSI configurations for joint CSI from the N number of the CSI configurations; calculating the M number of rank indexes (RI) based on each channel corresponding to the M number of CSI configurations; calculating a joint RI based on a synthetic channel generated by synthesizing the channels corresponding to the M number of the CSI configurations; and transmitting
(Continued)

information on whether to report the joint CSI based on a result from comparing the M number of the RIs and the joint RI.

5 Claims, 13 Drawing Sheets

(52) U.S. Cl.
CPC ........... *H04W 24/08* (2013.01); *H04L 5/0016* (2013.01); *H04L 5/0023* (2013.01)

(56) References Cited

U.S. PATENT DOCUMENTS

| | | | |
|---|---|---|---|
| 2013/0083681 A1* | 4/2013 | Ebrahimi Tazeh Mahalleh | H04L 5/0057 370/252 |
| 2013/0258874 A1* | 10/2013 | Khoshnevis | H04L 5/0057 370/252 |
| 2013/0322376 A1* | 12/2013 | Marinier | H04W 72/06 370/329 |
| 2013/0336214 A1* | 12/2013 | Sayana | H04B 7/024 370/328 |

OTHER PUBLICATIONS

China Telecom, et al., "Consideration on CSI feedback for CoMP," TSG-RAN WG1 Meeting #66bis, R1-113285, Oct. 2011, 6 pages.
PCT International Application No. PCT/KR2014/000351, Written Opinion of the International Searching Authority dated Apr. 25, 2014, 21 pages.

* cited by examiner

FIG. 5
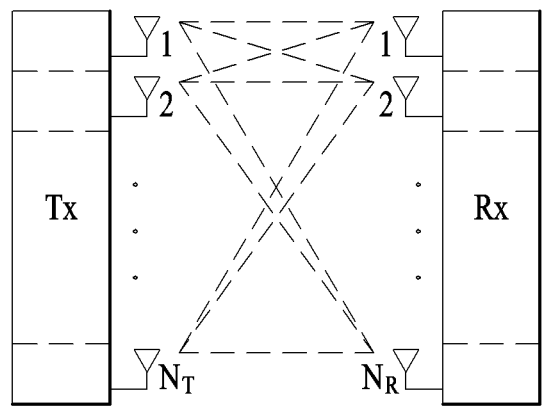
(a)
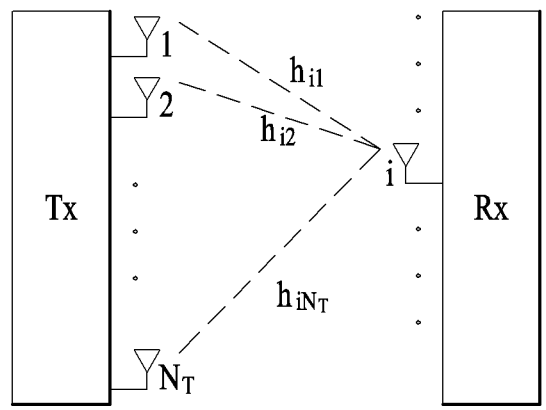
(b)

FIG. 10
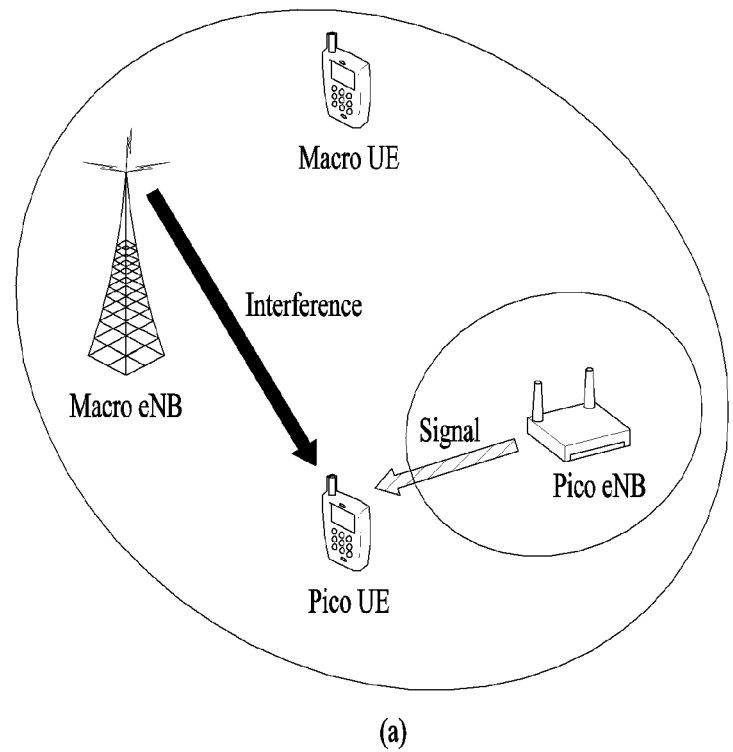
(a)
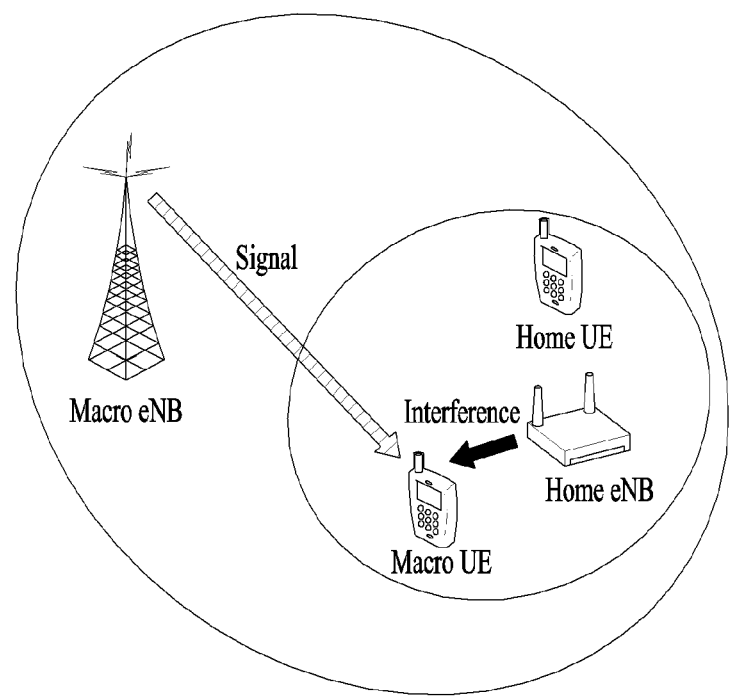
(b)

FIG. 13

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| CSI process 1 | RI, RTI=0 | | | WB W, CQI | | | | | WB W, CQI | | | | | WB W, CQI | | | | |
| CSI process 2 | | RI, RTI=0 | | | WB W, CQI | | | | | WB W, CQI | | | | | WB W, CQI | | | |

| | 36 | 37 | 38 | 39 | 40 | 41 | 42 | 43 | 44 | 45 | 46 | 47 | 48 | 49 | 50 | 51 | 52 | 53 | |
|---|---|---|---|---|---|---|---|---|---|---|---|---|---|---|---|---|---|---|---|
| CSI process 1 | | | WB W, CQI | | JT-RI, RTI=1 | | | WB JT-PMI1, JT-CQI | | | | WB JT-PMI1, JT-CQI | | | | | WB JT-PMI1, JT-CQI | ... |
| CSI process 2 | | WB W, CQI | | | | JT-RI, RTI=1 | | WB JT-PMI2, JT-CQI | | | | WB JT-PMI2, JT-CQI | | | | | WB JT-PMI2, JT-CQI | | ... |

FIG. 14

| | 0 | 1 | 2 | 3 | 4 | 5 | 6 | 7 | 8 | 9 | 10 | 11 | 12 | 13 | 14 | 15 | 16 | 17 | |
|---|---|---|---|---|---|---|---|---|---|---|---|---|---|---|---|---|---|---|---|
| CSI process 1 | RI, RTI=0 | | | WB W, CQI | | | | WB W, CQI | | | | WB W, CQI | | | | WB W, CQI | | | ... |

| | 18 | 19 | 20 | 21 | 22 | 23 | 24 | 25 | 26 | 27 | 28 | 29 | 30 | 31 | 32 | 33 | 34 | 35 | |
|---|---|---|---|---|---|---|---|---|---|---|---|---|---|---|---|---|---|---|---|
| CSI process 2 | RI | | WB W, CQI | | | | WB W, CQI | | | | WB W, CQI | | | | WB W, CQI | | | | ... |

| | 36 | 37 | 38 | 39 | 40 | 41 | 42 | 43 | 44 | 45 | 46 | 47 | 48 | 49 | 50 | 51 | 52 | 53 | |
|---|---|---|---|---|---|---|---|---|---|---|---|---|---|---|---|---|---|---|---|
| CSI process 1 | | | WB W, CQI | | JT-RI, RTI=1 | | | WB JT-PMI, JT-CQI | | | | WB JT-PMI, JT-CQI | | | | | | WB JT-PMI, JT-CQI | ... |
| CSI process 2 | | WB W, CQI | | | | RI | WB PMI, CQI | | | | | WB PMI, CQI | | | | | WB PMI, CQI | | ... |

METHOD AND APPARATUS FOR TRANSMITTING/RECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/000351, filed on Jan. 13, 2014, which claims the benefit of U.S. Provisional Application No. 61/752,376, filed on Jan. 14, 2013, the contents of which are all hereby incorporated by reference herein in their entirety.

FIELD OF THE INVENTION

The present invention relates to a wireless communication system and, most particularly, to a method and apparatus for feeding back channel state information in a wireless communication system.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipment (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DETAILED DESCRIPTION OF THE INVENTION

Technical Objects

Based on the aforementioned discussion, an object of the present invention is to provide a method and device for transmitting and receiving channel state information in a wireless communication system.

The technical objects that can be achieved through the present invention are not limited to what has been particularly described hereinabove and other technical objects not described herein will be more clearly understood by persons skilled in the art from the following detailed description.

Technical Solutions

In order to resolve the above-described problems, a method of a user equipment for transmitting channel state information (CSI) in a wireless communication system according to an exemplary embodiment of the present invention includes a step of receiving information on an N number of CSI configurations for reporting the CSI; a step of receiving information for selecting an M ($2 \leq M \leq N$) number of the CSI configurations for joint CSI from the N number of the CSI configurations; a step of calculating M number of rank indexes (RI) based on each channel corresponding to the M number of CSI configurations; a step of calculating a joint RI based on a synthetic channel generated by synthesizing channels corresponding to the M number of the CSI configurations; and a step of transmitting information on whether to report the joint CSI based on a result from comparing the M number of the RIs and the joint RI.

A method of a base station for receiving channel state information (CSI) in a wireless communication system according to another exemplary embodiment of the present invention includes a step of transmitting information on an N number of CSI configurations for reporting the CSI; a step of transmitting information for selecting an M ($2 \leq M \leq N$) number of the CSI configurations for joint CSI from the N number of the CSI configurations; and a step of receiving information on whether to report a joint CSI, wherein the information on whether to report a joint CSI is determined based on a comparison between M number of rank indexes (RI) based on each channel corresponding to the M number of CSI configurations and a joint RI based on a synthetic channel generated by synthesizing the channels corresponding to the M number of the CSI configurations.

A user equipment transmitting channel state information (CSI) in a wireless communication system according to yet another exemplary embodiment of the present invention includes a RF (Radio Frequency) unit; and a processor, wherein the processor is configured to receive information on an N number of CSI configurations for reporting the CSI, to receive information for selecting an M ($2 \leq M \leq N$) number of the CSI configurations for joint CSI from the N number of the CSI configurations, to calculate M number of rank indexes (RI) based on each channel corresponding to the M number of CSI configurations, to calculate a joint RI based on a synthetic channel generated by synthesizing the channels corresponding to the M number of the CSI configurations, and to transmit information on whether to report the joint CSI based on a result from comparing the M number of the RIs and the joint RI.

A base station receiving channel state information (CSI in a wireless communication system according to a further exemplary embodiment of the present invention includes a RF (Radio Frequency) unit; and a processor, wherein the processor is configured to transmit information on an N number of CSI configurations for reporting the CSI, to transmit information for selecting an M (2≤M≤N) number of the CSI configurations for joint CSI from the N number of the CSI configurations, and to receive information on whether to report a joint CSI, wherein the information on whether to report a joint CSI is determined based on a comparison between M number of rank indexes (RI) based on each channel corresponding to the M number of CSI configurations and a joint RI based on a synthetic channel generated by synthesizing the channels corresponding to the M number of the CSI configurations.

The following features may be commonly applied to the exemplary embodiments of the present invention.

The joint CSI may be reported when the joint RI is greater than the M number of RIs as much as a reference value or more.

An interference measurement for calculating the joint CSI may be performed by using any one interference measurement resource from the M number of CSI configurations.

An interference measurement for calculating the joint CSI may be performed by using an interference measurement resource corresponding to a CSI configuration having a lowest index from the M number of CSI configurations.

The joint CSI may include a joint precoding matrix index (PMI), a joint channel quality indicator (CQI), and a joint rank index (RI).

The joint RI and the joint PMI may be calculated based on the synthesized channel, and the joint CQI may be calculated by using a CSI-RS and an interference measurement resource among the M number of CSI configurations.

The general description of the present invention provided above and the detailed description of the present invention that will follow are merely exemplary and are provided for additional description of the appended claims of the present invention.

Advantageous Effects

According to an exemplary embodiment of the present invention, channel state information may be transmitted/received more efficiently in a wireless communication system.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

FIG. 5 illustrates a configuration of a wireless communication system having multiple antennae.

FIG. 10 illustrates an exemplary environment of a macro cell and a pico cell to which an ABS is being applied.

FIG. 13 illustrates an exemplary embodiment of a PUCCH feedback when following the feedback method according to the first exemplary embodiment.

FIG. 14 illustrates an exemplary embodiment of a PUCCH feedback when following the feedback method according to the second exemplary embodiment.

BEST MODE FOR CARRYING OUT THE PRESENT INVENTION

Figure 1:
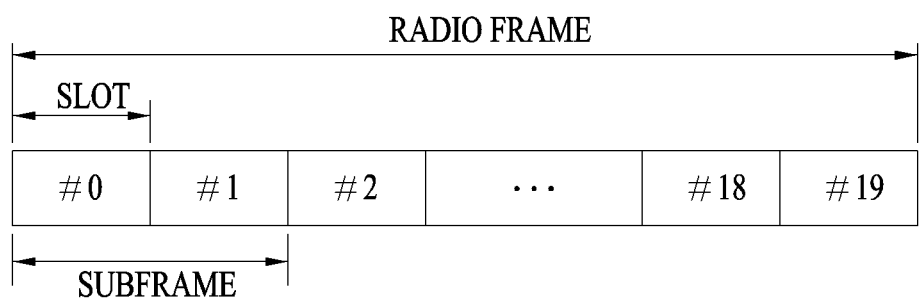
FIG. 1 illustrates an exemplary structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
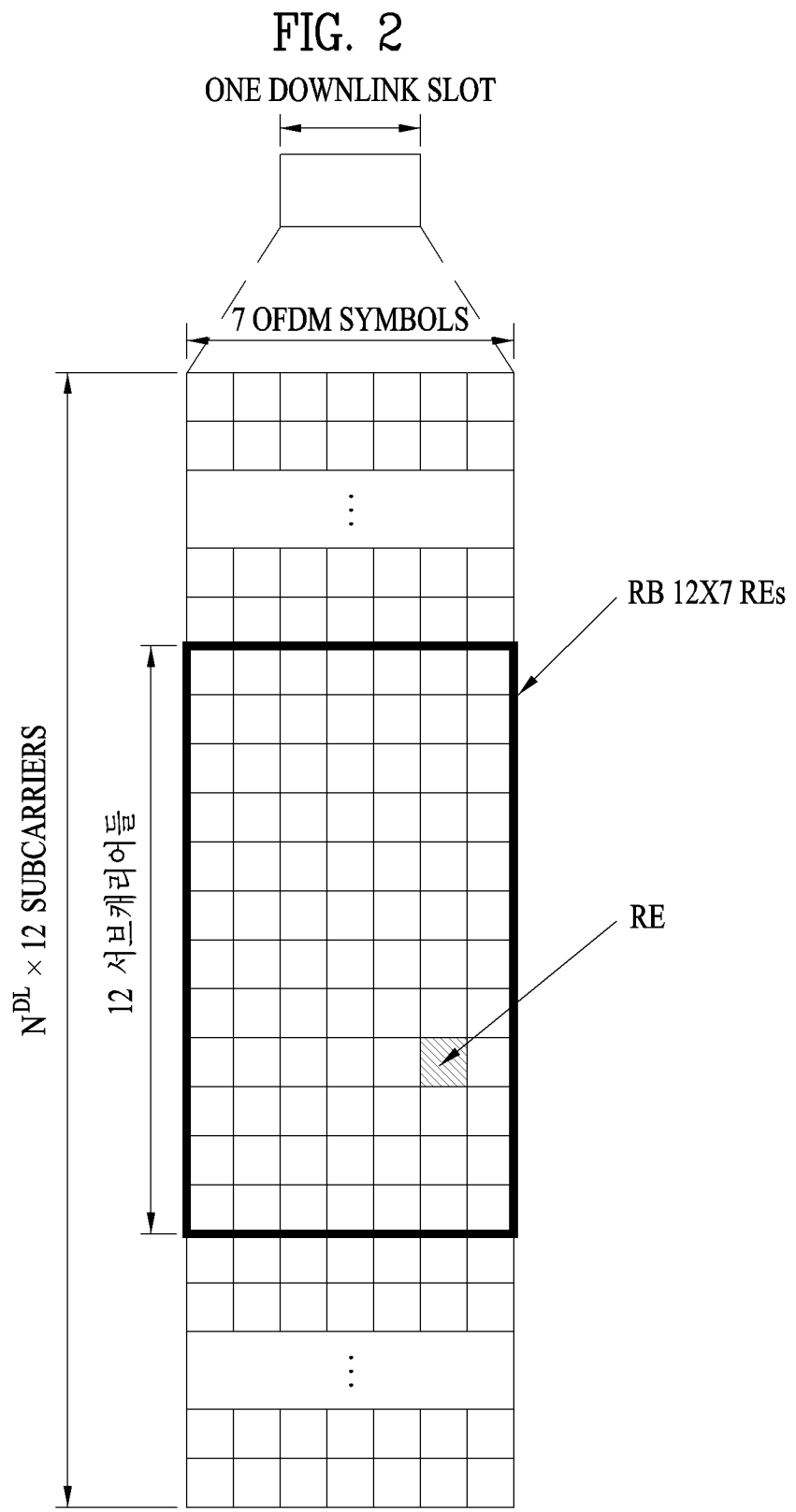
FIG. 2 illustrates an example of a resource grid respective to one downlink slot.

FIG. 2 illustrates an example of a resource grid respective to one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
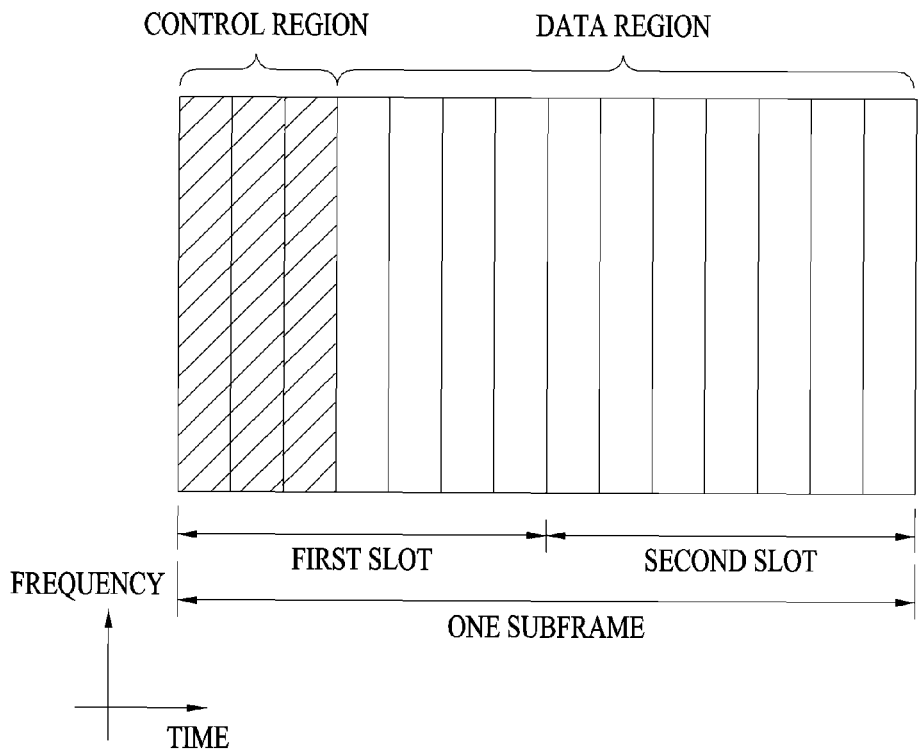
FIG. 3 illustrates a structure of a downlink subframe.

FIG. 3 illustrates a structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
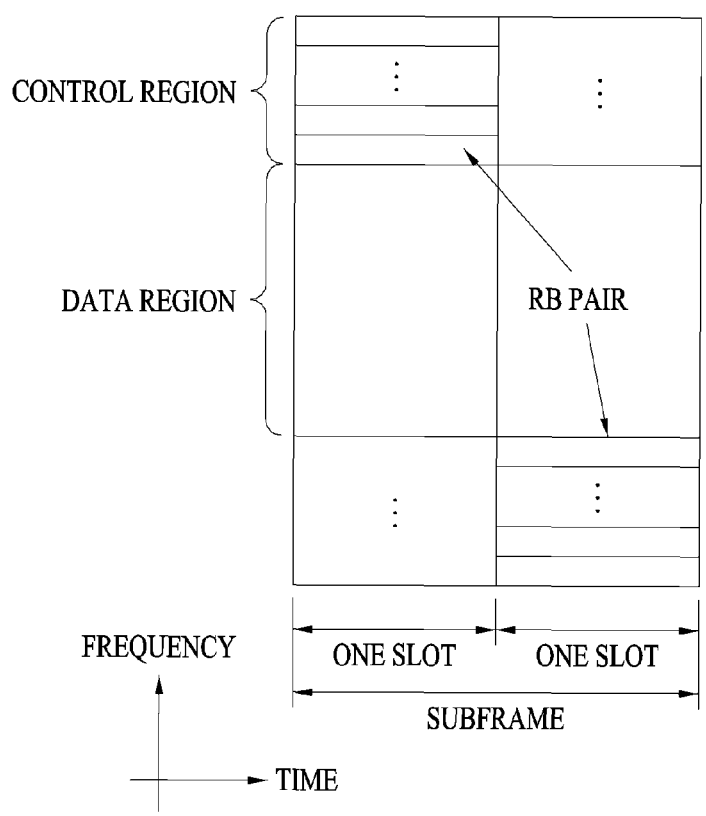
FIG. 4 illustrates a structure of an uplink subframe.

FIG. 4 illustrates a structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates a configuration of a wireless communication system having multiple antennae. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

$$W\hat{s} = WPs$$

[Equation 5]

Here, $W_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y=[y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$

[Equation 8]

Additive white Gaussian noise (AWGN) is added to an actual channel which has passed the channel matrix. The AWGN (n1, n2, ..., nNR) added to each of NR reception (Rx) antennas can be represented by Equation 9 below.

$$n=[n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

$$Hx+n$$

[Equation 10]

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
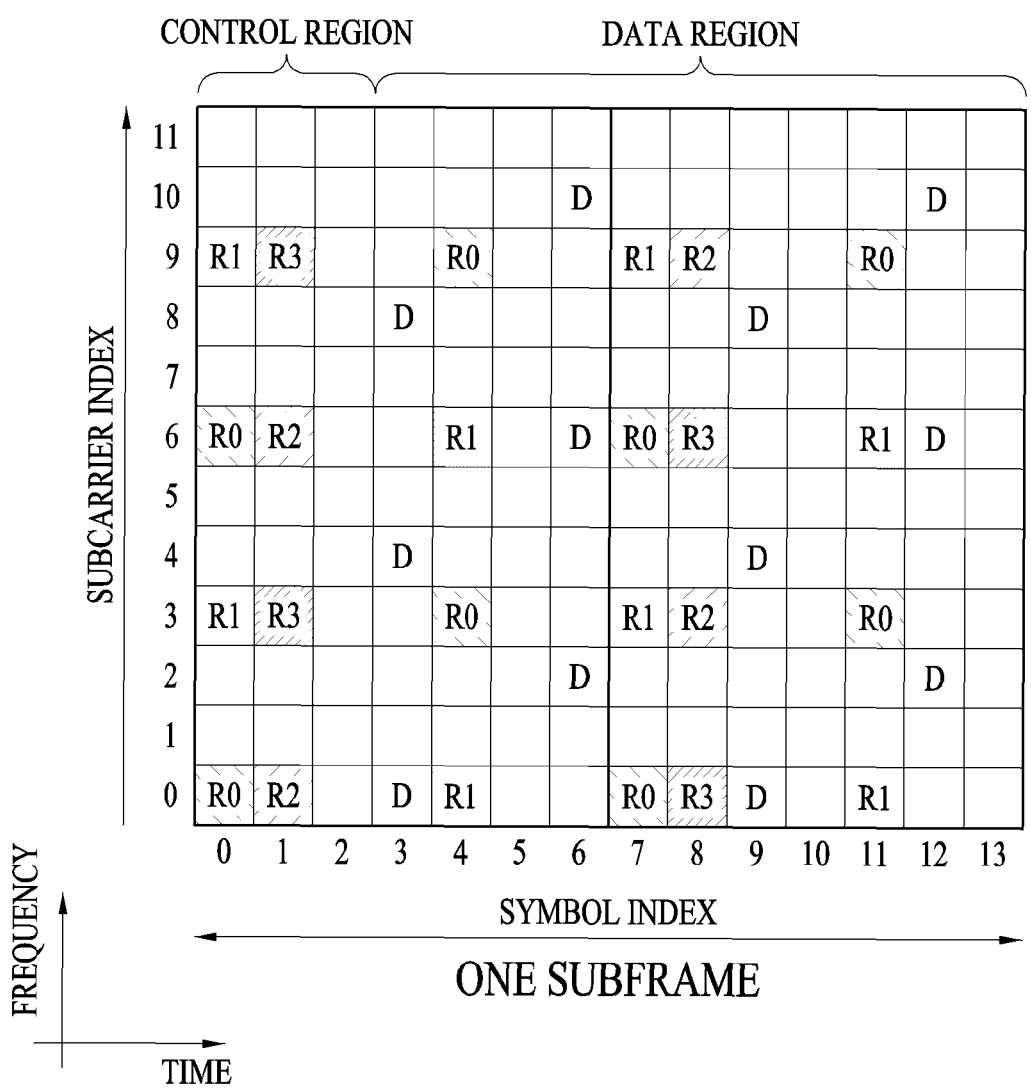
FIG. 6 illustrates patterns of conventional CRS and DRS.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
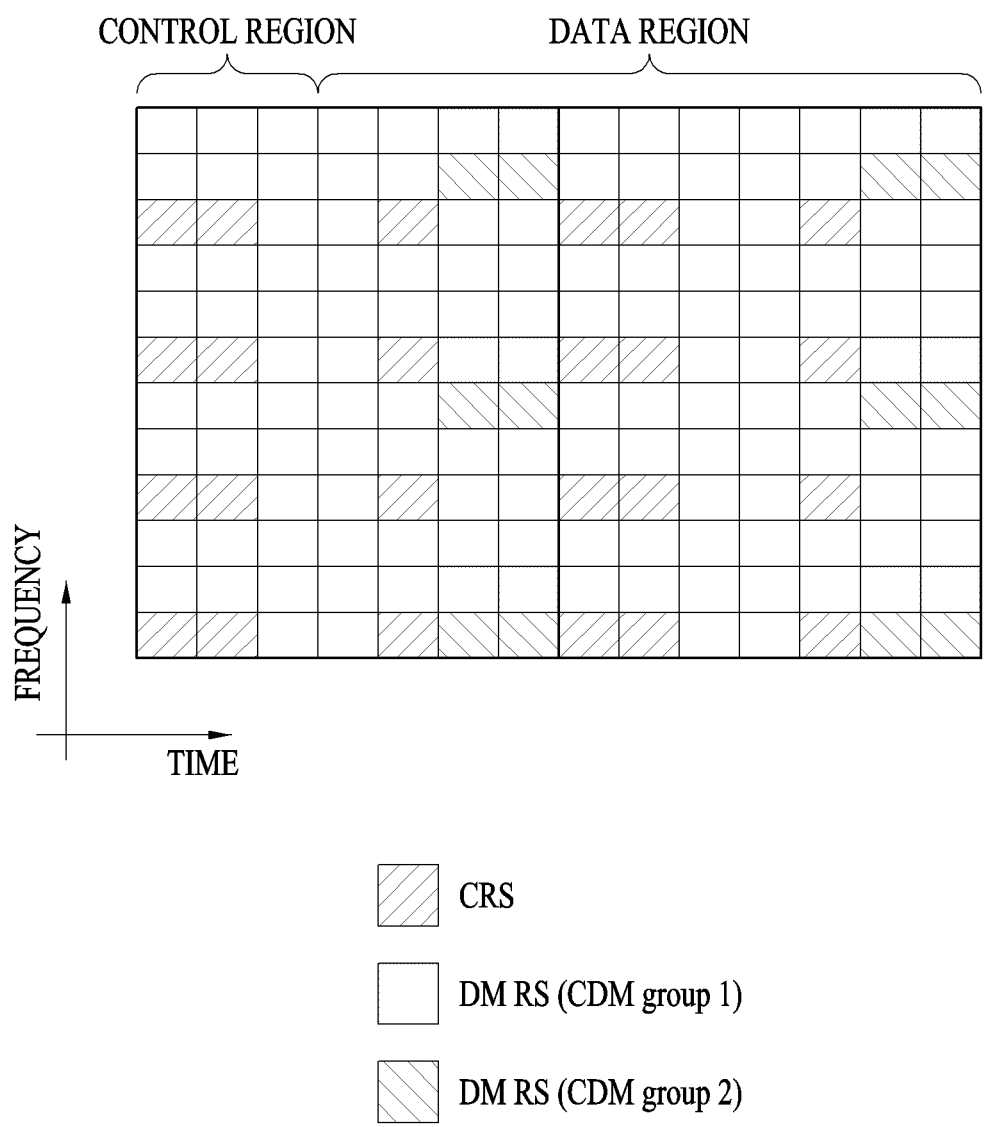
FIG. 7 illustrates an example of a DM RS pattern.

FIG. 7 illustrates an example of a DM RS pattern, which is defined in the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
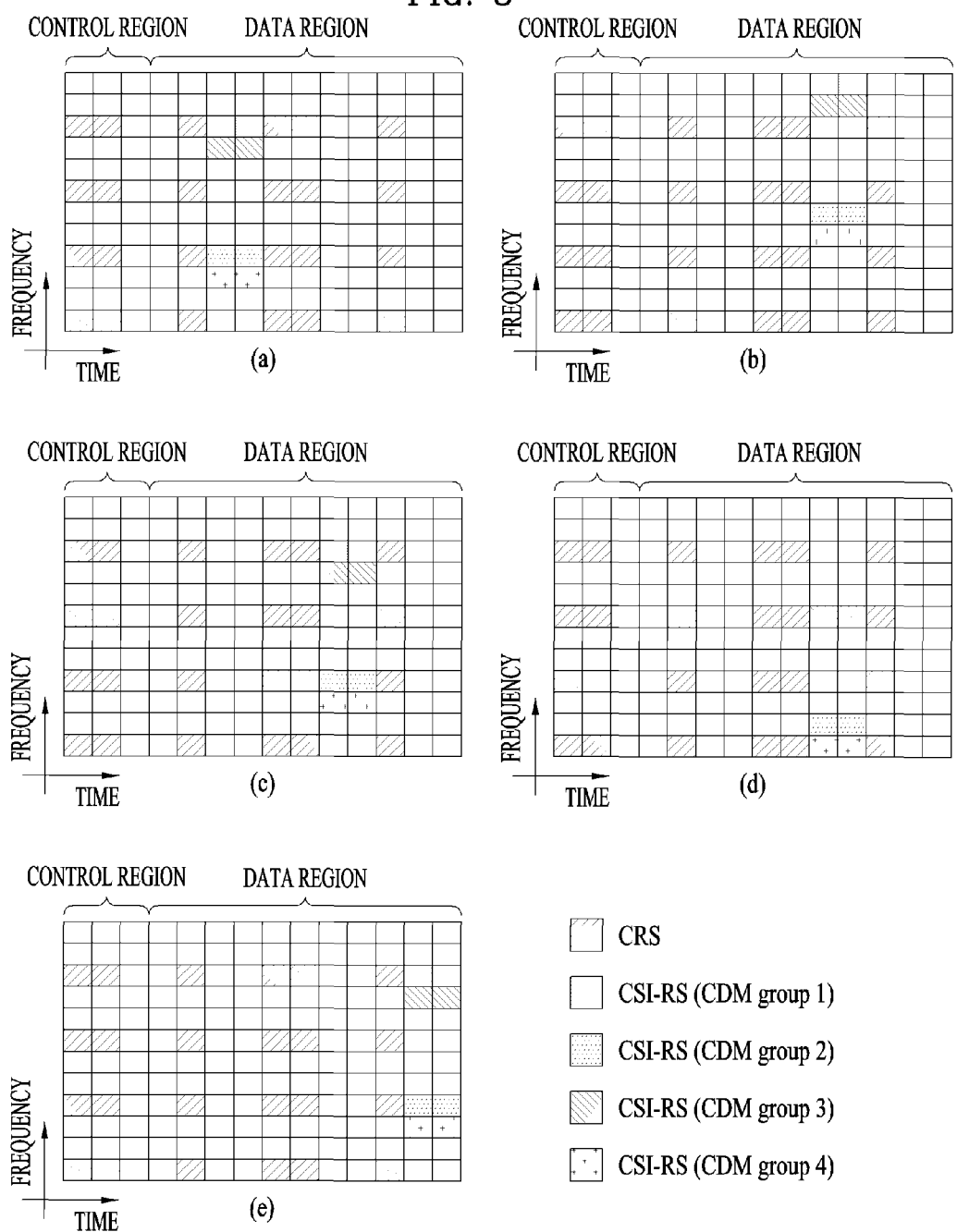
FIG. 8 illustrates examples of CSI-RS patterns.

FIG. 8 illustrates examples of CSI-RS patterns, which are defined in the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
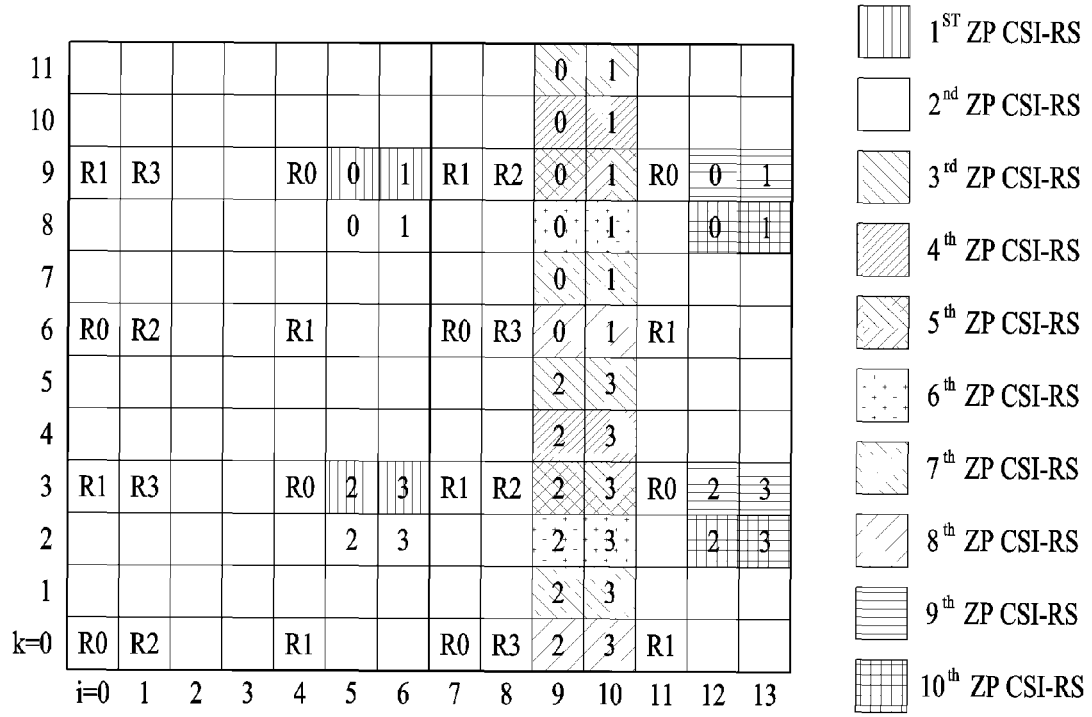
FIG. 9 illustrates an example of a ZP (Zero Power) CSI-RS pattern.

FIG. 9 illustrates an example of a ZP (Zero Power) CSI-RS pattern, which is defined in the LTE-A system. The purpose of ZP CSI-RS is broadly divided into two purposes. A first purpose corresponds to a purpose for enhancing CSI-RS performance. More specifically, in order to enhance a CSI-RS measurement performance of another network, one network performs muting on a CSI-RS RE of the other network, and, then, in order to allow its own UE to be capable of correctly performing rate matching, the corresponding network may configure the muted RE to the ZP CSI-RS and may then notify such configuration. A second purpose corresponds to a purpose of performing interference measurement for CoMP CQI calculation. More specifically, part of the network performs muting on the ZP CRS-RS RE, and the UE may calculate the CoMP CQI by measuring the interference from this ZP CSI-RS.

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

ABS (Almost Blank Subframe)

Hereinafter, inter-cell interference coordination (ICIC) and an almost blank subframe (ABS) in a time domain will be described.

First of all, an ICIC scheme for time resources will be described. A 3GPP LTE-A (release-10) system may divide all time domains into several subframes and indicate whether silencing or reduced transmission power is applied to each subframe. On a time axis, ICIC means coordination between different cells as to how to use subframes. At this time, information on utilization of the subframe may be defined through backhaul signaling or an OAM (operation, administration and maintenance) configuration, and this will be referred to as the ABS.

FIG. 10 illustrates an exemplary environment of a macro cell and a pico cell to which an ABS is being applied. In (a) of FIG. 10, when a macro cell as an aggressor and a pico cell as a victim exist, the macro cell may protect a specific subframe so that the pico cell may not be affected by strong interference. Alternatively, in (b) of FIG. 10, when a pico cell as an aggressor and a macro cell as a victim exist, the pico cell may protect a specific subframe so that the macro cell may not be affected by strong interference. In other words, the ABS means a subframe at which transmission power is reduced, traffic or activity is reduced. Also, the ABS includes a subframe to which nothing is transmitted.

For the ABS, an X2 interface used for communication between eNBs may be used. To well use the ABS, the eNB may configure restricted measurement to a user equipment UE. To this end, the eNB transmits two different types of measurement sets based on the ABS to the UE.

In other words, the eNB, which has received the ABS pattern of a neighboring cell, especially an aggressor cell through the X2 interface, configures the measurement sets to its serving UE on the basis of the ABS pattern of the corresponding eNB. In the legacy 3GPP LTE system, the UE should measure CRS at all the subframes to select MCS, RI, and PMI. However, if the neighboring cell configures the ABS and the aggressor cell does not perform downlink signal transmission at the corresponding subframe or transmits a downlink signal at a reduced power, interference is varied depending on the ABS pattern, whereby the UE should perform measurement at a specific subframe.

To this end, the eNB may command a specific UE to perform measurement only for a specific subframe and the UE may perform measurement at the specific subframe. This will be referred to as restricted measurement.

For restricted measurement, information on some of subframes, which are configured as the ABS, should be transferred through the interface between the base stations. For example, examples of the information may include ABS information and an ABS status, which are defined in the 3GPP LTE-A standard.

First of all, the ABS information may include an "ABS pattern info" field indicating a subframe, which will be used as ABS, through a bitmap. The "ABS pattern info" field may include a bitmap of 40 bits in case of FDD and a bitmap of maximum 70 bits, although varied depending on UL-DL configuration, in case of TDD. The FDD will be described exemplarily. 40 bits indicate 40 subframes, and if a bit value is 1, it may indicate the ABS, and if a bit value is 0, it may indicate a non-ABS. When restricted measurement is configured for the UE, for CRS measurement, the number of CRS antenna ports of the corresponding cell may be notified to the UE. Also, a measurement subset is a recommended restricted measurement set for configuring restricted measurement.

Next, the ABS status information indicates whether the eNB should change the ABS pattern. "Usable ABS pattern Info" included in the ABS status information is a subset of "ABS Pattern Info", and indicates whether the subframe designated as ABS has been used for interference mitigation. Also, "DL ABS status" is a ratio of the number of DL RBs scheduled at the subframe indicated by "Usable ABS pattern Info" and the number of RBs allocated for UE, which should be protected through the ABS, from the number of the above DL RBs. The "DL ABS status" indicates information as to how the ABS has been efficiently used by the victim cell for its purpose.

As described above, the measurement subset comprised of subsets of the ABS pattern is the subframe used as a static ABS, and the other subframes included in the ABS pattern may be determined by the eNB whether they will be used as the ABS depending on traffic.

Restricted RLM and RRM/CSI Measurement

When a specific cell reduces a transmission power at a specific resource region, a variation rate of interference signals for each resource region, which are received by a neighboring cell, is increased. If an average of such interference signals is obtained regardless of the resource region, it is difficult to normally obtain effects of CoMP and ICIC.

For example, time domain ICIC is a means for protecting throughput of a pico cell by allowing a macro cell to use the ABS for UE of the pico cell for a certain time period. In particular, the macro cell reduces the transmission power to reach maximum 9 dB at a specific subframe, whereby cell range extension (CRE) effect of the pico cell is obtained. That is, in an environment where the macro cell and the pico cell, which have a relation of an aggressor cell and a victim cell, exist, the macro cell may reduce a downlink transmission power or does not perform signal transmission, whereby throughput of the pico cell may be obtained. The UE of the macro cell and the UE of the pico cell perform subframe-specific measurement in accordance with the ABS pattern of the macro cell. This operation will be referred to as restricted measurement. This is to calculate CSI based on a power level pattern of the macro cell.

If the macro cell reduces the transmission power at the specific subframe through the ABS, a signal and interference level of the pico cell, which are seen to the UE of the pico cell, are varied per subframe. In particular, a UE located at the cell edge may not detect a signal from its serving eNB of the UE due to strong interference at the subframe other than the ABS. Although variation of the interference signals per subframe occurs seriously, in order to avoid averaging of the interference signals, restricted measurement has been introduced.

For the UE that needs the restricted measurement, a plurality of subframe sets C0 and C1 for channel measurement may be configured by higher layer signaling (for example, RRC signaling). The UE performs specific channel measurement and reporting for the subframe sets in accordance with the configured subframe sets. Also, for radio link monitoring (RLM)/radio resource management (RRM), it is preferable that the UE of the pico cell performs measurement at the ABS.

If restricted measurement for CSI measurement is configured, that is, if subframe pattern for CSI report is configured, the UE measures and reports CSI per subframe pattern. For example, CSI-restricted measurement defined in the 3GPP LTE Rel-10 is as follows. If "csi-subframe-pattern-Config" is configured, the UE receives two types of CSI measurement patterns of "csi-Meas-subframe set 1" and "csi-Meas-subframe set 2". One of the two CSI measurement patterns is the subframe set for allowing the macro eNB to reduce interference to the pico eNB by using the ABS, and the other one is the subframe set used by the macro eNB as a normal subframe.

"csi-Meas-subframe set 1" may indicate a subframe set for allowing the macro eNB to mitigate interference through an operation of the ABS, and "csi-Meas-subframe set 2" may indicate a subframe set in which interference from the macro eNB is not mitigated. The serving eNB may signal CRS information of the aggressor cell to the UE while configuring restricted CSI measurement for the UE. The UE that has received CRS information of the aggressor eNB may report more improved CSI by performing CRS IC of the aggressor eNB at "csi-Meas-subframe set 1". However, even though the UE has CRS IC capability, the UE should not perform CRS IC at "csi-Meas-subframe set 2" of a normal subframe at which the aggressor eNB does not perform an operation for reducing a transmission power. This is because that interference at the other data RE except the CRS is not reduced even though CRS interference has been cancelled.

Even though the UE has received CRS information of the aggressor eNB, if "csi-subframe-pattern-Config" is not configured for the UE, the UE should not perform CRS IC for CSI measurement. That is, if "csi-Meas-subframe set 1" and "csi-Meas-subframe set 2" are not configured, the UE should not perform CRS IC for CSI measurement.

If "csi-subframe-pattern-Config" is configured for the UE but the UE does not receive CRS information of the aggressor eNB, the UE should not perform CRS IC operation for CSI measurement. If the UE performs CRS IC operation for CSI measurement at the specific subframe set, the UE should notify the eNB that the UE has performed CRS IC in calculating CSI value, and should notify the eNB of a corresponding subframe set at which the CRS IC operation has been performed.

If the eNB is intended to be reported CSI, to which CRS IC has been applied, at the specific subframe set by configuring "csi-subframe-pattern-Config" in the UE and providing CRS information of the aggressor eNB, the eNB should notify the UE of a subframe set at which the UE should perform CRS IC and a subframe set at which the UE should not perform CRS IC. Also, the subframe sets may be configured previously in the order of subframes signaled between the eNB and the UE. For example, if CRS information is given, "csi-Meas-subframe set 1" may be configured as the subframe set at which CRS IC should be performed, and "csi-Meas-subframe set 2" may be configured as the subframe set at which CRS IC should not be performed.

Cooperative Multipoint Transmission/Reception (CoMP) System

Hereinafter, CoMP (Cooperative Multipoint Transmission/Reception) will be described.

The post-LTE-A system considers a system that enhances system throughput through cooperation between cells. This system will be referred to a Cooperative Multipoint Transmission/Reception (CoMP) system. The CoMP system means a communication system that two or more base stations, access points or cells perform communication with the user equipment in cooperative with one another to effectively perform communication between a specific user equipment and the base station, access point or cell. In the present invention, the base station, the access point, or the cell may be used to refer to the same thing.

Generally, in a multi-cell environment where a frequency reuse factor is 1, throughput of the user equipment located at the cell edge and average sector throughput may be reduced due to inter-cell interference (ICI). In order to reduce ICI, a method for enabling a user equipment located at the cell edge in an environment restricted by interference to have proper throughput by using a simple passive scheme such as fractional frequency reuse (FFR) through user equipment specific power control has been applied to the LTE system according to the related art. However, it may be more preferable to reduce ICI or allow the user equipment to reuse ICI as a desired signal than to reduce use of frequency resources per cell. To this end, a CoMP transmission scheme may be used.

Figure 11:
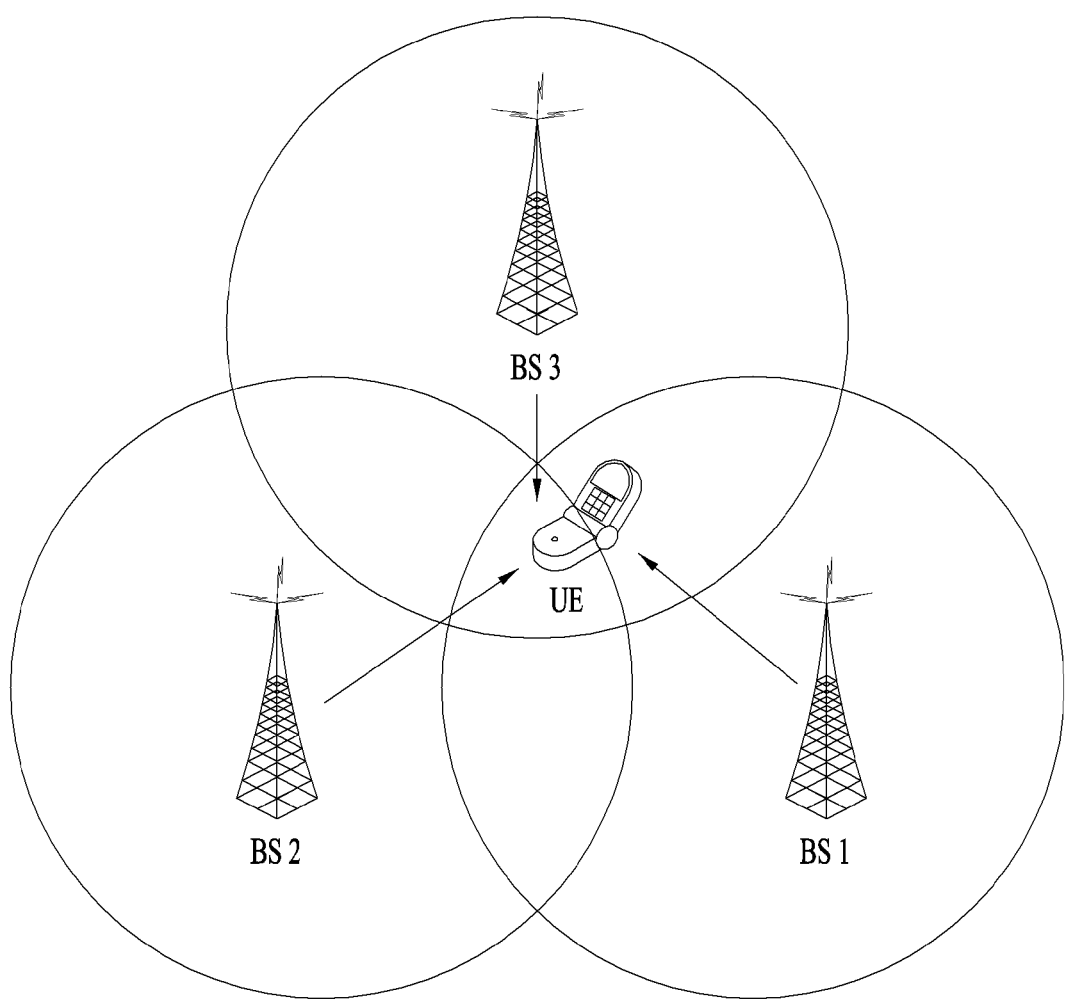
FIG. 11 illustrates an example of performing CoMP.

FIG. 11 illustrates an example of performing CoMP. Referring to FIG. 11, the wireless communication system includes a plurality of base stations BS1, BS2 and BS3, which perform CoMP, and a user equipment. The plurality of base stations BS1, BS2 and B3 that perform CoMP may efficiently transmit data to the user equipment in cooperative with one another.

In case of the downlink, the CoMP transmission method may be divided into the following methods.

First of all, in a Joint Processing method, the user equipment may simultaneously receive data from multiple base stations each performing the CoMP transmission method.

Subsequently, in a Joint Transmission method, the user equipment may join signals received from each of the multiple base stations performing the CoMP transmission method, thereby enhancing the receiving performance.

Subsequently, in a DPS (Dynamic Cell Selection) method, among the multiple base stations performing the CoMP transmission method, one of the base stations transmits data to the user equipment at a specific time point.

Subsequently, in a DPB (Dynamic Cell Blanking) method, among the multiple base stations performing the CoMP transmission method, by dynamically muting neighboring base stations that cause interference, the user equipment may enhance its receiving performance from the serving base station.

In case of a CoMP (Coordinated Scheduling/beamforming, CoMP-CS/CB) method (CoMP-CS), the user equipment may instantly receive data via beamforming from one base station, i.e., the serving cell.

In an uplink, in case the joint processing (CoMP-JP) method is being applied, multiple base stations may simultaneously receive a PUSCH signal from the user equipment (Joint Reception, JR). Conversely, in case of the Coordinated Scheduling/beamforming method (CoMP-CS/CB), only one base station may receive the PUSCH. A decision on whether or not to use the Coordinated Scheduling/beamforming method may be decided by a coordinated cell (or base station).

Channel State Information (CSI) Feedback of Coordinated Transmission (CoMP) System A user equipment using the CoMP transmission method, i.e., a CoMP UE may perform feedback of channel information (hereinafter referred to as CSI feedback) respective to multiple base stations performing the CoMP transmission method. Based upon the CSI feedback, a Network Scheduler may select an adequate CoMP transmission method that can enhance the transmission rate from the CoMP-JP method, the CoMP-CS/CB, and the DPS method. In order to do so, as a method for configuring CSI feedback within the multiple base stations performing the CoMP transmission method, the CoMP UE may follow a periodic feedback transmission method using an uplink PUCCH. In this case, the feedback configurations respective to each of the base stations may be independent from one another. Accordingly, in the following specification according to an exemplary embodiment of the present invention, each operation feeding-back channel information while having an independent feedback configuration will hereinafter be referred to as a CSI process. One or more of the above-described CSI processes may exist in one or more serving cells.

Figure 12:
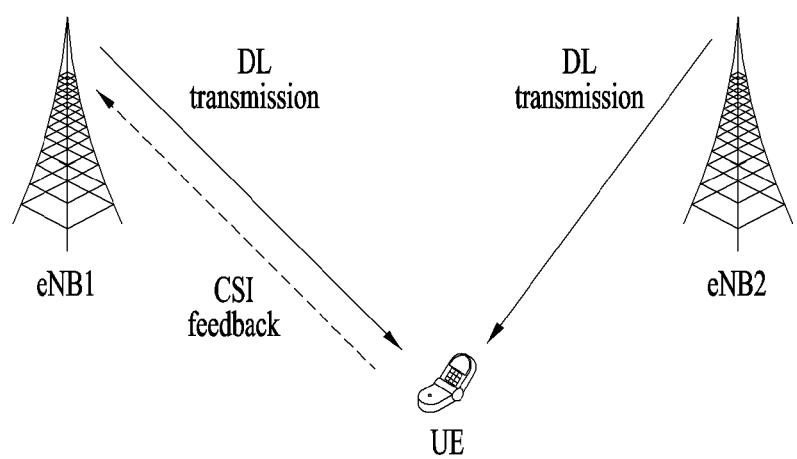
FIG. 12 illustrates an exemplary case of performing downlink CoMP operations.

FIG. 12 illustrates an exemplary case of performing downlink CoMP operations.

In FIG. 12, the UE is located between eNB1 and eNB2, and, in order to resolve the problem of interference to the user equipment, the two eNBs (i.e., eNB1, eNB2) perform CoMP operations, such as JT, DCS, CS/CB. In order to support (or aid) the CoMP operations of the base station, the UE performs adequate CSI feedback, and, herein, information that is being transmitted through CSI feedback includes PMI information of each eNB and CQI information, and channel information between the two eNBs for JT (e.g., phase offset information between the two eNB channels) may be additionally included.

In FIG. 12, although the UE is transmitting a CSI feedback signal to eNB1, which corresponds to its own serving cell, in some cases, the UE may also transmit a CSI feedback signal to eNB2 or to both eNBs. Additionally, in FIG. 12, although the basic unit participating in the CoMP is described as the eNB, in addition to the eNB, the transmission point that is being controlled by the eNB may also become the basic unit participating in the CoMP.

In order to perform CoMP scheduling in the network, the UE is required to feedback not only downlink (DL) CSI information of the serving eNB but also DL CSI information of neighboring eNBs that are participating in the CoMP. In order to do so, the UE feeds back multiple CSI processes reflecting diverse data transmission eNBs and diverse interference environments.

Accordingly, the LTE system uses IMR (Interference Measurement Resource) for performing interference measurement when calculating CoMP CSI. One UE may receive multiple IMR configurations, and an independent configuration may be given to each of the multiple IMR configurations. More specifically, each IMR is configured to have independent cycle period, offset, and resource configuration, and the base station may signal such configuration to the UE by using higher layer signaling, such as RRC (Radio Resource Control) signaling, and so on.

Additionally, in the LTE system, in order to measure a desired channel when calculating CoMP CSI, CSI-RS is used. One UE may receive multiple CSI-RS configurations, and, at this point, each CSI-RS has an independent configuration. More specifically, each CSI-RS is configured of an independent cycle period and offset, resource configuration, power control (Pc), and number of antenna ports. And, information related to CSI-RS is signaled to the UE from the base station through higher layer signaling (RRC, and so on).

Among the multiple CSI-RSs and multiple IMRs configured to the UE, one CSI-RS resource for signal measuring and one CSI process that is associated with an Interference measurement resource (IMR) for interference measuring may be defined. The UE feeds back CSI information, which is derived from different CSI processes, at an independent cycle period and subframe offset.

More specifically, each CSI process has an independent CSI feedback configuration. Such CSI-RS resource and IMR resource association information and CSI feedback configurations may be notified by the base station to the UE via higher layer signaling, such as RRC, and so on, with respect to each CSI process. For example, the UE assumes that the UE receives the configuration of three CSI processes, as shown below in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent a CSI-RS that is received from eNB 1, which corresponds to a serving eNB of the UE, and a CSI-RS that is received from eNB 2, which corresponds to a neighboring eNB participating in the cooperation. In case it is assumed that the IMRs configured with respect to each of the CSI processes shown in Table 1 are configured as shown below in Table 2,

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, eNB 1 is set to perform muting, and eNB 2 is set to perform data transmission, and the UE is configured to measure interference caused by other eNBs excluding eNB 1 from IMR 0. Similarly, in IMR 1, eNB 2 is set to perform muting, and eNB 1 is set to perform data transmission, and the UE is configured to measure interference caused by other eNBs excluding eNB 2 from IMR 1. Additionally, in IMR 2, eNB 1 and eNB 2 may both be set to perform muting, and the UE is configured to measure interference caused by other eNBs excluding eNB 1 and eNB 2 from IMR 2.

Accordingly, as shown in Table 1 and Table 2, in case of receiving data from eNB 1, the CSI information of CSI process 0 indicates optimal RI, PMI, CQI information. In case of receiving data from eNB 2, the CSI information of CSI process 1 indicates optimal RI, PMI, CQI information. In case of receiving data from eNB 1 and receiving no interference from eNB 2, the CSI information of CSI process 2 indicates optimal RI, PMI, CQI information.

Reference CSI Process

It is preferable that CSI processes being configured to a single UE share values, which are dependent to one another, for CoMP scheduling. For example, in case a JT (joint transmission) is performed between TP 1 (Transmission point 1) and TP 2, JT scheduling becomes easier in the first CSI process respective to the first cell and the second CSI process respective to the second cell, when the RI and the selected subband index becomes the same.

Accordingly, among the CSI processes configured to the UE, part or all of the CSI processes may be limited (or restricted) to share a common CSI (e.g., RI, PMI, or selected subband index, and so on). For simplicity in the description, among the CSI processes that are limited to have a common CSI value, a CSI process acting as a reference standard for configuring the CSI value may be referred to as a reference CSI process, the remaining CSI processes excluding the reference CSI process may be referred to as linked CSI processes. A linked CSI process may directly feed-back the same CSI value of the reference CSI process without having to perform any separate calculation.

For example, the CSI of the linked CSI process may be configured as a CSI most recently reported by the reference CSI process, at a time point of the reporting of the corresponding CSI or prior to the time point of the reporting. Additionally, although a detailed description has been given for a case when the reference CSI process and the linked CSI processes share a common RI for simplicity in the description, the present invention will not be limited only to this, and, therefore, the present invention may also be applied to a case when a common PMI or a common selected subband index is shared. Hereinafter, the RI of a linked CSI process may be referred to as a reference RI, and the RI of a linked CSI process may be referred to as a linked RI.

Comparison of Coordinated Transmission (CoMP) Transmission Schemes

First of all, among the above-described CoMP transmission schemes (or methods), a comparison on performances of the DPB scheme and the JT scheme will be described.

In light of SINR (Signal to Interference plus Noise Ratio) of the UE, DPB and JT are equally influenced by the interference and the noise, which collectively configure the denominator of the SINR. Conversely, the two CoMP schemes show their differences in signal power, which configures the numerator of the SINR. The DPB receives signal power from one TP, whereas the JT receives signal power from multiple TPs. More specifically, when it is assumed that the signal power being received from TP 1, which is participating in the JT, is s1, and when it is assumed that the signal power being received from TP 2 is s2, the following calculation may be made: $\|s1+s2\|^2=\|s1\|^2+\|s2\|^2+2\cos(\theta)\|s1\|\|s2\|$. In case of a Coherent JT, "Theta" becomes equal to 0, and, in case of a non-coherent JT, 2 "Theta" is given a random value in accordance with the channel. When $\|s1\|\cong\|s2\|$, due to the UE being positioned at a cell edge, and when it is assumed that JT is performed between the two TPs, in accordance with the "theta" value, the signal power is given a maximum gain of 6 dB as compared to DPB. However, in the non-coherent JT, in case the two signals are destructively combined, the non-coherent JT is given a signal power lower than the DPB.

In light of the network, unlike the JT, in the DPB, by muting the power in order to eliminate (or remove) interference, the all of the cells receiving interference from the neighboring TP may benefit from the resulting interference mitigation. Therefore, in light of the network, DPB may provide a more enhanced performance as compared to the JT.

Accordingly, when considering the DPB and JT schemes in light of the UE and the network, even in case of a coherent JT, if a 6 dB gain cannot be followed by an increase in rank, it will be more efficient to apply the DPB, which allows all of the neighboring cells to benefit from the removal of the interference. More specifically, when compared with the DPB, if the rank of the JT is higher, in light of the UE, since an enhancement in the throughput due to a large increase in the rank, even if interference is still caused to other cells, it will be efficient to apply the JT. Similarly, even in case of a non-coherent JT, when compared with the DPB, if an increase in the rank follows in accordance with a signal power gain, the application of the JT is more efficient.

Hereinafter, among the above-described CoMP transmission schemes, a comparison will be made between the performance of the DPS scheme and the performance of the JT scheme.

In light of the UE, since the JT is in a state of having the signal power removed as well as having the interference received from a neighboring cell removed, in the aspect of the SINR, the JT has a greater gain as compared to the DPS. However, in case the data traffic of a neighboring cell participating in the coordination is low, and, in case the traffic of a serving cell is high, a DPS may provide a more excellent performance as compared to the JT. This is because in the DPS, the UE may occupy the remaining resources of the neighboring cell without any scheduling competition (or contention).

Also, in light of the network, in case the data traffic of a neighboring cell participating in the coordination is low, and, in case the traffic of a serving cell is high, the DPS may also allow an effective resource management to be carried out. More specifically, in this case, the DPS distributes (or disperses) the high traffic of a serving cell, thereby increasing the throughput of UEs belonging to the remaining serving cells and also increasing a resource usage rate by using idle resources of a neighboring coordinated cell.

Accordingly, when considering the DPS and JT schemes in light of the UE and the network, even if a SNR gain increases in the JT as compared to the DPS, if an increase in rank does not follow, it will be efficient to apply the DPS. More specifically, as compared to the DPS, if the rank of the JT is higher, in light of the UE throughput, since the increase in rank causes a large enhancement in the throughput, even though the traffic dispersion is not realized perfectly, it will be more efficient to apply the JT.

Method for Applying CoMP-JT According to the Present Invention

Accordingly, the feedback method according to the present invention calculates JT CSI by using part of the CSI processes among the multiple CSI processes, and, then, when a rank of the JT CSI is higher than a rank value that is calculated based upon each CSI process, the method may be provided with a characteristic of configuring a feedback of part (or some) or all of the part of the CSI processes as a JT CSI feedback.

More specifically, the base station allocates multiple CSI processes that are required in DPB or DPS to the UE, and, among the allocated multiple CSI processes, the base station may designate (or select) part of the CSI processes that will be used for JT CSI calculation. The UE may additionally calculate the JT CSI by using the designated CSI processes, and, in case there is an increase in the rank in comparison with the rank value respective to each of the designated CSI processes, among the part of the designated CSI processes, at least one CSI feedback may be replaced with the JT CSI feedback, and such replacement may be reported. The UE transmits a signal to the base station, wherein the signal indicates that the CSI feedback of the at least one CSI process has been replaced with the JT CSI feedback. The UE may also transmit a signal indicating the feedback of which particular CSI process, among the part (or some) of the CSI processes that are being used for calculating the JT CSI, has been replaced with the JT CSI feedback.

For example, when three CSI processes corresponding to Table 1 and Table 2 are configured to the UE, CSI processes 1, 2, and 3 may be respectively targeted to non-CoMP, DPS, and DPB. Hereinafter, the feedback method according to the present invention will be described in detail by giving the CSI processes 1, 2, and 3 as the respective examples.

First of all, among the multiple CSI processes, the base station designates part of the CSI processes that are used for performing JT CSI calculation.

Among the three CSI processes, the base station designates to the UE part of the CSI processes that are used for performing JT CSI calculation. The base station may use higher layer signaling (e.g., RRC signaling). Alternatively, the base station may configure settings by pre-deciding part of the CSI processes that are used for performing JT CSI calculation. For example, in case JT is being applied between two TPs, the base station may predetermine (or pre-configure) CSI processes 1 and 2 as the CSI processes for performing JT CSI calculation.

Thereafter, the UE calculates the JT CSI.

In addition to calculating the CSI for each CSI process, as performed in the related art method, the UE calculates the JT CSI by using the designated CSI processes (e.g., CSI processes 1 and 2). In order to perform JT CSI calculation, channel measurement and interference measurement are required.

In order to perform channel measurement, the UE estimates each channel respective the CSI-RS of CSI process 1 and the CSI-RS of CSI process 2, and, when each of the estimated channels is referred to H1 and H2, the UE configures one composite channel [H1 H2].

In order to perform interference measurement, the UE uses one of an IMR of CSI process 1 and an IMR of CSI process 2. Which one of the IMRs is to be used may be notified by the base station to the UE via higher layer signaling (e.g., RRC signaling). Alternatively, among the part of the CSI processes that are used for performing JT CSI calculation, the UE may use the IMR of a CSI process having the lowest index. After performing the channel and interference measurements respective to JT, the UE calculates optimal JT rank, JT PMI, and JT CQI based upon the measurement results.

JT PMI is configured of two PMIs, PMI of CSI process 1 and PMI of CSI process 2, and each PMI is decided from a codebook, which is decided based upon a number of CSI-RS ports of each CSI process. For example, in case the numbers of CSI-RS ports of CSI process 1 and CSI process 2 are respectively equal to 4 and 2, the PMI of CSI process 1 is searched by using a 4 Tx (Transmission Antenna) codebook, and the PMI of CSI process 2 is searched by using a 2 Tx codebook.

Alternatively, the JT PMI may be configured of one PMI, and the codebook for transmitting the JT PMI may be decided based upon a sum of the number of CSI-RS ports of CSI process 1 and the number of CSI-RS ports of CSI process 2. For example, in case each of the number of CSI-RS ports of CSI process 1 and the number of CSI-RS ports of CSI process 2 is equal to 4, the UE decides the JT PMI by using a 8 Tx codebook.

Meanwhile, in order to reduce the amount of calculation, instead of calculating all JT CSI, the UE only calculates the JT RI firsthand, and, then, after deciding whether or not to perform JT CSI report by using the method described below, the UE may calculate the JT PMI and JT CQI, and so on.

Thereafter, the UE determines whether or not to perform JT CSI report.

After calculating both CSI and JT CSI of each CSI process, the UE decides whether or not to report the JT CSI in accordance with an application standard, and, then, in case of reporting the JT CSI, this may be notified to the base station through a control channel.

Although the application standard respective to whether or not to perform JT CSI report may be diversely configured, it will be efficient to perform the decision based upon an increase in the rank value, as described above. More specifically, by comparing each rank value of the CSI process used for performing calculation of the JT CSI with the JT rank value, in case the JT rank is equal to or greater than the reference value, the UE reports the JT CSI. The reference value may correspond to a static value that is pre-arranged between the base station and the UE, or the reference value may correspond to semi-static information that is notified to the UE by the base station via higher layer signaling (e.g., RRC signaling). Hereinafter, it will be assumed that the reference value is equal to 1 for simplicity in the description. For example, among the rank values of the CSI processes that are used for performing JT CSI calculation, in case the JT rank value is greater than the maximum (or highest) value, the UE reports the JT CSI.

Moreover, in addition to the CSI processes that are used for performing JT CSI calculation, the UE may also determine whether or not to perform JT CSI report by comparing each rank of all CSI processes that are configured to the UE with the JT rank value.

In case the UE determines to perform JT CSI report, the UE transmits information indicating that the JT CSI will be reported to the base station. For example, a value respective whether or not to perform JT CSI report may be transmitted as 1 bit along with the RI.

Thereafter, the UE reports the JT CSI to the base station.

Based upon the above-described determined result, when the UE determines to perform JT CSI report, the CSI feedback of at least one or all of the CSI processes that are used for performing JT CSI calculation is replaced with the JT CSI feedback.

Meanwhile, the above-described method for performing JT CSI calculation and report may be directly applied to the CSI feedback for a 3D MIMO or Massive MIMO system without modification. In a 3D MIMO system, as a number of transmission antennae is increased to M (e.g., M=128), the UE performs CSI report by referring to RS corresponding to a larger number of transmission antennae as compared to the conventional method. As a method for supporting this process, the base station divides the M number of antennae to N number of antenna groups, and, then, the base station transmits an RS corresponding to each group. For example, the base station groups a total of 16 transmission antennae by 8 transmission antennae so as to form two antenna groups, and, then, the base station configures settings to the UE by dividing 8 Tx CSI-RS corresponding to each antenna group to CSI process 1 and CSI process 2. More specifically, the UE is assigned with the CSI process 1 configuration, and, then, the UE performs channel estimation by using CSI-RS of antenna group 1, which is configured in process 1, and, then, the UE reports the CSI. Additionally, the UE is assigned with the CSI process 2 configuration, and, then, the UE performs channel estimation by using CSI-RS of antenna group 2, which is configured in process 2, and, then, the UE reports the CSI.

As described above, in the 3D MIMO system, when a CSI process is allocated for each subset of the transmission antennae, the UE may use the JT CSI report method. More specifically, the UE may generate a composite channel from the RI, which is obtained from each process, and the CSI-RS of the multiple CSI processes, and, by comparing the generated composite channel with the calculated massive antenna transmission RI, the UE may decide whether to report the CSI, which is independently calculated for each process or whether to report a massive antenna transmission CSI, which is optimized for the massive antenna transmission. The massive antenna transmission CSI may be calculated by directly using the above-described JT CSI calculation method without any modification.

Hereinafter, a RI, PMI, and CQI feedback method of a case when the CSI feedback of all CSI processes that are used for performing JT CSI calculation according to a first embodiment, and a RI, PMI, and CQI feedback method of a case when the CSI feedback of only one CSI process among the CSI processes that are used for performing JT CSI calculation according to a second embodiment, will be described in detail.

First Embodiment

The first exemplary embodiment corresponds to a method of replacing the CSI of all CSI processes that are used for performing JT CSI calculation with the JT CSI feedback. Hereinafter, a method for calculating the RI, PMI, and CQI according to the first exemplary embodiment will hereinafter be described.

In case of the RI, JT RI is reported instead of the RI in all of the CSI processes that are used for performing JT CSI calculation (e.g., CSI processes 1 and 2). A maximum value of the JT RI will hereinafter be described in detail along with the PMI.

In case of the PMI, the PMI of the CSI process that is used for performing JT CSI calculation is calculated based upon the JT RI. For example, in case JT Rank 2 is being fed-back, the PMIs of both process 1 and process 2 are respectively calculated based upon JT Rank 2. Additionally, when it is assumed that the base station performs JT transmission, the UE selects the PMI that can achieve the highest transmission rate and then feeds-back the selected PMI. The PMIs that are being transmitted through processes 1 and 2 will be respectively referred to as JT PMI 1 and JT PMI 2, and both PMIs will be collectively referred to as JT PMI.

JT PMI 1 and JT PMI 2 are respectively searched in a codebook that is selected based upon the number of CSI-RS ports respective to each CSI process. For example, in case the numbers of CSI-RS ports of CSI process 1 and process 2 are respectively equal to 4 and 2, JT PMI 1 is searched by using a 4 Tx codebook, and JT PMI 2 is searched by using a 2 Tx codebook. In the above-described method, when determining the JT rank value, the maximum rank will be limited (or restricted) to a minimum value among the number of CSI-RS ports of CSI process 1 and the number of CSI-RS ports of CSI process 2. After receiving the JT CSI, when the base station performs an actual JT transmission, the base station creates a JT precoding matrix by performing an adequate concatenation of JT PMI 1 and JT PMI 2. Conversely, after receiving the JT CSI, if the base station does perform an actual JT transmission, the base station may consider JT PMI 1 and JT PMI 2 as independent precoding and may then determine an optimal precoder.

Alternatively, the codebook for transmitting the JT PMI may also be decided based upon a sum of the number of CSI-RS ports of CSI process 1 and the number of CSI-RS ports of CSI process 2. For example, in case each of the number of CSI-RS ports of CSI process 1 and the number of CSI-RS ports of CSI process 2 is equal to 4, the JT PMI is determined by using a 8 Tx codebook, and JT PMI 1 and JT PMI 2 are given the same JT PMI value. In the above-described method, when determining the JT rank value, the maximum rank will be limited (or restricted) to the sum of the number of CSI-RS ports of CSI process 1 and the number of CSI-RS ports of CSI process 2. After receiving the JT CSI, when JT PMI 1 is equal to JT PMI 2, and when the base station performs an actual JT transmission, the base station generates a precoding matrix based upon JT PMI 1. If JT PMI 1 is not equal to JT PMI 2, this may be considered as a decoding error, and, accordingly, the base station does not perform JT transmission.

In case of CQI, the CQI of the CSI process that is used for performing JT CSI calculation is calculated based upon the JT RI and the JT PMI. The CQI may be determined (or decided) as described below.

In the first exemplary embodiment, a first method for calculating the CQI corresponds to performing CQI calculation of CSI process i, among the CSI processes that are used for performing JT CSI calculation, based upon the JT rank and JT PMI i by using only the CSI-RS and IMR of CSI process i. More specifically, although the JT rank and JT PMI i are used, the data transmission channel and interference environment calculate the CQI by using unique values respectively defined in each CSI process i. For simplicity in the description, the CQI value corresponding to CSI process i will be referred to as a partial JT CQI i. Although the partial JT CQI has used the JT rank and JT PMI i, since the JT transmission from coordinated cells is not assumed herein, the partial JT CQI is different from the JT CQI. Accordingly, when the base station performs an actual JT after receiving the partial JT CQI, a JT-specific CQI should be calculated once again after adequately compensating for the reported partial JT CQI. Conversely, in case the base station does not perform the JT, the base station configures a MCS based upon the partial JT CQI.

Herein, if the codebook for transmitting the JT PMI is determined (or decided) based upon a sum of the number of CSI-RS ports of CSI process 1 and the number of CSI-RS ports of CSI process 2, the PMI that is assumed when calculating the partial JT CQI corresponds to a partial matrix, which is mapped to the CSI-RS of the CSI process i in a matrix of JT PMI i. For example, in case each of the number of CSI-RS ports of CSI process 1 and the number of CSI-RS ports of CSI process 2 is equal to 4, the JT PMI is decided by using a 8 Tx codebook, and, then, partial JT CQI 1 is calculated by assuming a partial matrix that is configured of row 1 to row 4 in the matrix of JT PMI 1 as the precoder, and, then, partial JT CQI 2 is calculated by assuming a partial matrix that is configured of row 5 to row 8 in the matrix of JT PMI 2 as the precoder.

In the first exemplary embodiment, a second method for calculating the CQI corresponds to having part of the CSI processes that are used for performing JT CQI calculation transmit the JT CQI and having the remaining CSI processes report the partial JT CQI. The JT CQI is calculated based upon an estimated SINR corresponding to when JT transmission is performed. At this point, the CSI process that is to transmit the JT CQI and the CSI process that transmits the partial JT CQI may be designated by the base station via higher layer signaling (e.g., RRC signaling), or a CSI process having a low index may be determined (or decided) as the CSI process transmitting the JT CQI. In this method, the UE calculates a JT CQI that can be estimated in case the base station has performed JT based upon JT RI and JT PMI, and, then, the UE reports the calculated JT CQI to the base station. Accordingly, in case the base station performs JT, this method is advantageous in that the reported value of the JT CQI may be directly used without having to perform any separate compensation.

If the codebook for transmitting JT PMI is decided based upon a sum of the number of CSI-RS ports of CSI process 1 and the number of CSI-RS ports of CSI process 2, when calculating the JT CQI, JT PMI 1 or JT PMI 2 will be assumed that the precoder. Herein, as described above, JT PMI 1 and JT PMI 2 are equal to one another.

Additionally, if JT PMI 1 and JT PMI 2 have been respectively calculated from a codebook, which is selected based upon the number of CSI-RS ports of the respective CSI process, when calculating the JT CQI, JT PMI 1 and JT PMI 2 are adequately processed with concatenation, thereby being assumed as the precoder. For example, when both of JT PMI 1 and JT PMI 2 have been selected from a 4 Tx codebook, the UE assumes that first to fourth rows of the precoding matrix configure JT PMI 1, and that fifth to eighth rows of the precoding matrix configure JT PMI 2.

In the first exemplary embodiment, a third method for calculating the CQI corresponds to using the above-described first method and then additionally transmitting the JT CQI through part of the CSI processes. For example, a difference between the partial JT CQI and the JT CQI, which are calculated by using the first method, may be additionally transmitted.

FIG. 13 illustrates an exemplary embodiment of a PUCCH feedback when following the feedback method according to the first exemplary embodiment.

The three CSI processes that are defined in Table 1 and Table 2 are configured to the UE, and, among these processes, CSI processes 1 and 2 are designated for JT CSI calculation. In addition to the CSI of each CSI process, the UE additionally calculates the JT CSI by using CSI-RS and IMR of CSI processes 1 and 2.

The RI and JT RI of each CSI process are compared to one another at a time point when the RI is being transmitted, and, then, if a specific condition pre-arranged between the UE and the base station is satisfied (or met), the JT CSI is fed-back until the next RI transmission point. For example, when the JT RI is determined to be greater than the RI values respective to each of CSI processes 1 and 2, the UE feeds-back the JT CSI.

More specifically, in the exemplary embodiment of FIG. 13, in Subframe 39, if the UE has calculated JT RI as 2, the RI of process 1 as 1, and the RI of process 2 as 1, the JT RI is greater than the RI of each process. Accordingly, the UE feeds-back JT-RI in each of Subframes 40 and 41 through CSI processes 1 and 2. The UE notifies the base station that the JT RI has been fed-back instead of the RI, which is calculated for each process. As a RTI (rank type indicator) shown in FIG. 14, this information may be encoded along with the RI and may then be transmitted. In case the RTI is equal to 0, this may indicate a rank that is calculated for each CSI process, and, in case the RTI is equal to 1, this may indicate a JT rank. After feeding-back the JT RI, and up to a point prior to updating the next RI, the JT PMI and the JT CQI are calculated based upon the JT-RI and then fed-back accordingly. The JT CQI may be calculated by using any one of the above-described three JT CQI calculation methods. In case the UE has configured the RTI as 1, the UE may transmit diverse values, such as PMI, CQI, or phase compensation information between TPs, which are useful for performing JT scheduling.

In the PUCCH feedback, the RI feedback cycle period (or interval) may be configured to have an extended length, and, accordingly, dynamics of the above-described JT CSI report may be limited (or restricted). However, such problem may be resolved by having the base station configure the RI feedback cycle to have a shorter length. Additionally, in case of a LTE-A system, for example, since the CSI-RS itself is being transmitted while having a cycle period of 5 msec or more, it may be difficult to determine that this exemplary embodiment degrades the dynamics of the JT CSI report.

Second Embodiment

The second exemplary embodiment corresponds to a method of replacing the CSI feedback of one of the CSI processes that are used for performing JT CSI calculation with the JT CSI feedback. Hereinafter, a method for calculating the RI, PMI, and CQI according to the second exemplary embodiment will hereinafter be described.

At this point, one CSI process that feeds-back the JT CSI may be designated to the UE by the base station via higher layer signaling (e.g., RRC signaling), or, among the CSI processes being used for performing the JT CSI calculation, the CSI process having the lowest index may be designated as the CSI process that feeds-back the JT CSI. For example, in case of the CSI processes of Table 1 and Table 2, when calculating the JT CSI by using CSI processes 1 and 2, the UE may replace the CSI of CSI process 1, which corresponds to the CSI process having the lowest index, with the JT CSI.

In case of the RI, one CSI process is selected from the CSI processes that are used for performing JT CSI calculation, i.e., CSI processes 1 and 2 in the example of Table 1 and Table 2, and, then, the corresponding RI feedback value is replaced with the JT RI. A maximum value of the JT RI will hereinafter be described in detail along with the PMI.

In case of the PMI, the JT PMI is calculated based upon the JT RI. The JT PMI is fed-back by using the process as the CSI process through which the JT rank is transmitted.

The JT PMI is configured of two PMIs, PMI of CSI process 1 and PMI of CSI process 2, and each PMI is searched from a codebook, which is decided based upon a number of CSI-RS ports of each CSI process. For example, in case the numbers of CSI-RS ports of CSI process 1 and CSI process 2 are respectively equal to 4 and 2, the PMI of CSI process 1 is searched by using a 4 Tx codebook, and the PMI of CSI process 2 is searched by using a 2 Tx codebook. In the above-described method, when determining the JT rank value, the maximum rank will be limited (or restricted) to a minimum value among the number of CSI-RS ports of CSI process 1 and the number of CSI-RS ports of CSI process 2. After receiving the JT CSI, when the base station performs an actual JT transmission, the base station creates a JT precoding matrix by performing an adequate concatenation of JT PMI 1 and JT PMI 2. Conversely, after receiving the JT CSI, if the base station does perform an actual JT transmission, the base station may consider JT PMI 1 and JT PMI 2 as independent precoding and may then determine an optimal precoder.

Alternatively, the JT PMI is configured of one PMI, and the codebook for transmitting the JT PMI may also be decided based upon a sum of the number of CSI-RS ports of CSI process 1 and the number of CSI-RS ports of CSI process 2. For example, in case each of the number of CSI-RS ports of CSI process 1 and the number of CSI-RS ports of CSI process 2 is equal to 4, the JT PMI is determined by using a 8 Tx codebook. In the above-described method, when determining the JT rank value, the maximum rank will be limited (or restricted) to the sum of the number of CSI-RS ports of CSI process 1 and the number of CSI-RS ports of CSI process 2. After receiving the JT CSI, when the base station determines to perform an actual JT transmission, the base station generates a JT precoding matrix based upon JT PMI.

In case of the CQI, the JT CQI is calculated based upon the JT rank and the JT PMI. The JT CQI is transmitted by using the same CSI process as the CSI process that is used for transmitting the JT rank. Since the method for calculating the JT CQI is the same as the method for calculating the CQI according to the first exemplary embodiment, a detailed description of the same will be omitted.

FIG. 14 illustrates an exemplary embodiment of a PUCCH feedback when following the feedback method according to the second exemplary embodiment.

The three CSI processes that are defined in Table 1 and Table 2 are configured to the UE, and, among these processes, CSI processes 1 and 2 are designated for JT CSI calculation. In addition to the CSI of each CSI process, the UE additionally calculates the JT CSI by using CSI-RS and IMR of CSI processes 1 and 2.

The RI and JT RI of each CSI process are compared to one another at a time point when the RI is being transmitted, and, then, if a specific condition pre-arranged between the UE and the base station is satisfied (or met), the JT CSI is fed-back until the next RI transmission point. For example, when the JT RI is determined to be greater than the RI values respective to each of CSI processes 1 and 2, the UE replaces the CSI feedback respective to one of the CSI process, among the CSI processes 1 and 2, with the JT CSI, and, then, the UE feeds-back the replaced JT CSI.

More specifically, in the exemplary embodiment of FIG. 14, in Subframe 39, if the UE has calculated JT RI as 2, the RI of CSI process 1 as 1, and the RI of CSI process 2 as 1, the JT RI is greater than the RI of each process. Accordingly, the UE feeds-back JT-RI in Subframe 40 through CSI process 1. The UE notifies the base station that the JT CSI has been fed-back through a CSI process through which the JT CSI is fed-back. As a RTI (rank type indicator) shown in FIG. 15, this information may be encoded along with the RI and may then be transmitted. In case the RTI is equal to 0, this may indicate a rank that is calculated for each CSI process. At this point, the method is identical to the conventional CSI feedback method. Conversely, in case the RTI is equal to 1, the rank that is processed with joint encoding signifies a JT rank, and, in this case, the JT PMI and the JT CQI may be fed-back. After feeding-back the JT RI, and up to a point prior to updating the next RI, the JT PMI and the JT CQI are calculated based upon the JT-RI and then fed-back accordingly. In case the UE has configured the RTI as 1, the UE may transmit diverse values, such as PMI, CQI, or phase compensation information between TPs, which are useful for performing JT scheduling.

In the PUCCH feedback, the RI feedback cycle period (or interval) may be configured to have an extended length, and, accordingly, dynamics of the above-described JT CSI report may be limited (or restricted). However, such problem may be resolved by having the base station configure the RI feedback cycle to have a shorter length. Additionally, in case of a LTE-A system, for example, since the CSI-RS itself is being transmitted while having a cycle period of 5 msec or more, it may be difficult to determine that this exemplary embodiment degrades the dynamics of the JT CSI report.

Figure 15:
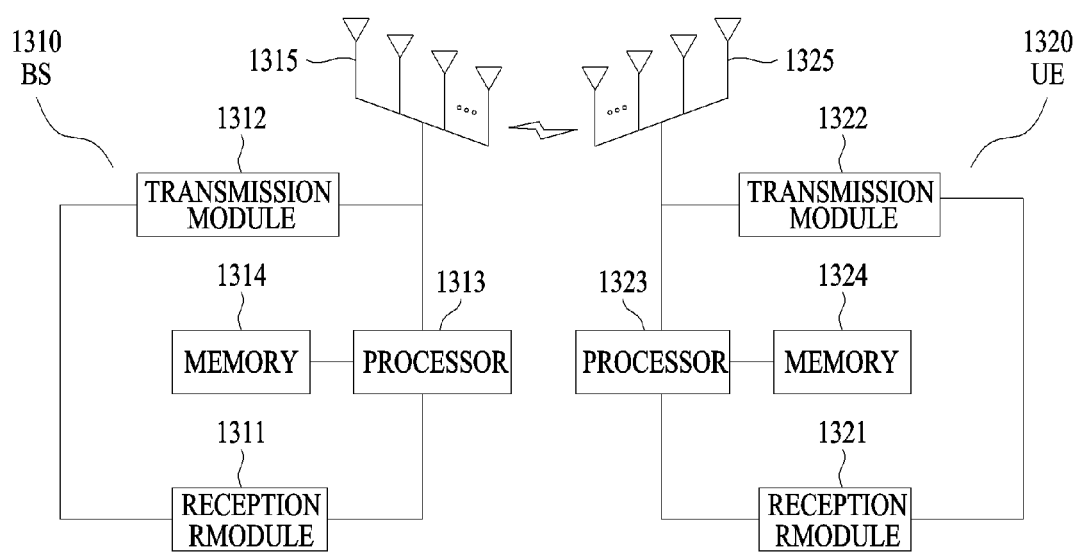
FIG. 15 illustrates a base station and a user equipment that can be applied to an exemplary embodiment of the present invention.

FIG. 15 illustrates a base station and a user equipment that can be applied to an exemplary embodiment of the present invention.

In case a relay is included in a wireless communication system, in a backhaul link, communication is established between the base station and the relay, and, in an access link, communication is established between the relay and the user equipment. Therefore, the base station or the user equipment, which are presented as examples in the drawing, may be replaced with the relay in accordance with the corresponding circumstances.

Referring to FIG. 15, a wireless communication device includes a base station (1510) and a user equipment (1520). The base station (1510) includes a processor (1513), a memory (1514), and a Radio Frequency (RF) unit (1511, 1312). The processor (1513) may be configured to realize the procedures and/or methods, which are proposed in the present invention. The memory (1514) is connected to the processor (1513) and stores diverse information related to the operations of the processor (1513). The RF unit (1516) is connected to the processor (1513) and transmits and/or receives radio signals. The user equipment (1520) includes a processor (1523), a memory (1524), and a RF unit (1521, 1422). The processor (1523) may be configured to realize the procedures and/or methods, which are proposed in the present invention. The memory (1524) is connected to the processor (1523) and stores diverse information related to the operations of the processor (1523). The RF unit (1521, 1322) is connected to the processor (1523) and transmits and/or receives radio signals. The base station (1510) and/or the user equipment (1520) may have a single antenna or multiple antennae. The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention. In this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor.

The memory may be located inside or outside of the processor, and the memory unit may transmit and receive data to and from the processor by using a wide range of methods that have already been disclosed.

As described above, a detailed description of the preferred mode for carrying out the present invention disclosed herein is provided so that anyone skilled in the art can be capable of realizing and performing the present invention. Although the description provided above is described with reference to the preferred mode for carrying out the present invention, it will be apparent to those skilled in the art that the present invention may be diversely corrected and modified without departing from the spirit and scope of the present invention, which are disclosed in the appended claims of the present invention disclosed below. Therefore, the present invention will not be limited only to the exemplary embodiments disclosed herein. For example, anyone skilled in the art may use a method of combining each component mentioned in the above-described exemplary embodiments. Instead, the present invention seeks to provide a broadest scope of the present invention best fitting the disclosed principles and new characteristics of the invention described herein.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. It should be understood that the present invention is not intended to be limited only to the exemplary embodiments presented herein. Instead, the present invention seeks to provide a broadest scope of the present invention best fitting the disclosed principles and new characteristics of the invention described herein. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be used in a wireless communication apparatus, such as a user equipment, a relay, a base station, and so on.

The invention claimed is:

1. A method for transmitting channel state information (CSI) in a wireless communication system, the method performed by a user equipment communicating with a plurality of base stations based on Cooperative Multipoint Transmission and Reception (CoMP) system and comprising:
  receiving information on an N number of CSI configurations for reporting the CSI;
  receiving information for selecting an M (2≤M≤N) number of the CSI configurations for joint CSI from the N number of the CSI configurations,
  wherein the joint CSI includes a joint precoding matrix index (PMI), a joint channel quality indicator (CQI), and a joint rank index (RI);
  calculating M number of RIs based on each channel corresponding to the M number of CSI configurations;
  calculating the joint RI based on a synthetic channel generated by synthesizing channels corresponding to the M number of the CSI configurations;
  reporting the joint CSI when the joint RI exceeds the M number of RIs by a specific value; and
  based on the reported joint CSI:
    determining a CoMP transmission method to be a joint transmission method; and
    receiving join signals from each of the plurality of base stations based on the determined joint transmission method.

2. The method of claim 1, wherein an interference measurement for calculating the joint CSI is performed by using any one interference measurement resource from the M number of CSI configurations.

3. The method of claim 1, wherein an interference measurement for calculating the joint CSI is performed by using an interference measurement resource corresponding to a CSI configuration having a lowest index from the M number of CSI configurations.

4. The method of claim 1, wherein the joint RI and the joint PMI are calculated based on the synthesized channel, and wherein the joint CQI is calculated by using a CSI-RS and an interference measurement resource among the M number of CSI configurations.

5. A user equipment for transmitting channel state information (CSI) in a wireless communication system, the user equipment configured to communicate with a plurality of base stations based on Cooperative Multipoint Transmission and Reception (CoMP) system and comprising:
  a RF (Radio Frequency) unit; and
  a processor,
    wherein the processor is configured to:
      receive information on an N number of CSI configurations for reporting the CSI,
      receive information for selecting an M (2≤M≤N) number of the CSI configurations for joint CSI from the N number of the CSI configurations, wherein the joint CSI includes a joint precoding matrix index (PMI), a joint channel quality indicator (CQI), and a joint rank index (RI), calculate M number of rank indexes (RI) based on each channel corresponding to the M number of CSI configurations, calculate the joint RI based on a synthetic channel generated by synthesizing the channels corresponding to the M number of the CSI configurations, report the joint CSI when the joint RI exceeds the M number of RIs by a specific value, and based on the reported joint CSI:
  determining a CoMP transmission method to be a joint transmission method, and
  receive join signals from each of the plurality of base stations based on the determined joint transmission method.

* * * * *